UNITED STATES PATENT OFFICE.

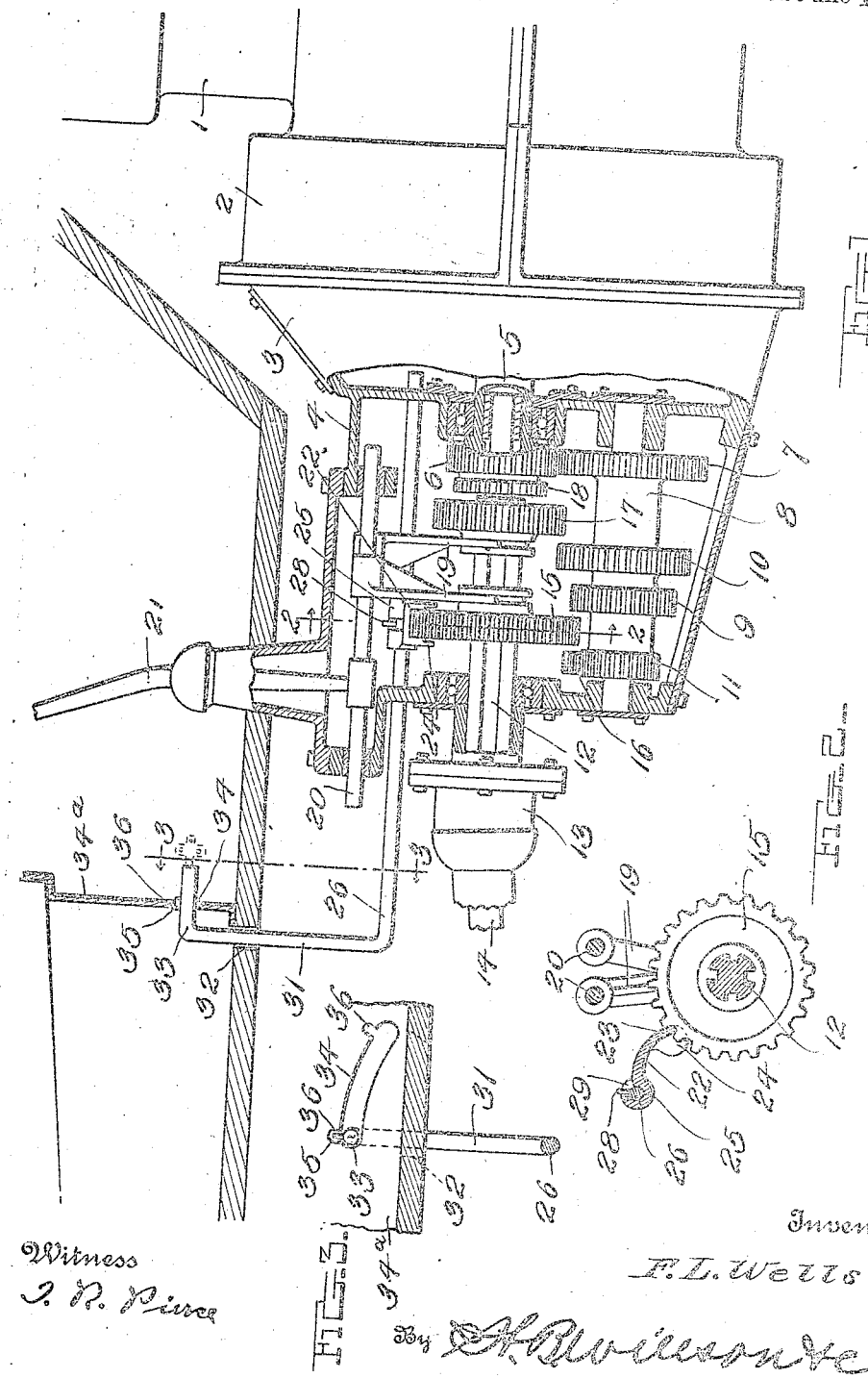

FREDERICK L. WELLS, OF RUTLAND, VERMONT.

AUTOMOBILE-LOCK.

1,343,424. Specification of Letters Patent. Patented June 15, 1920.

Application filed May 16, 1919. Serial No. 297,613.

*To all whom it may concern:*

Be it known that I, FREDERICK L. WELLS, a subject of the King of England, residing at Rutland, in the county of Rutland and State of Vermont, have invented certain new and useful Improvements in Automobile-Locks; and I do declare the following to be a full, clear, and exact description of the invention, such as will enable others skilled in the art to which it appertains to make and use the same.

My invention has for its principal object to provide a locking device for automobiles, associated with one of the transmission gears in such manner as to lock the propeller shaft which leads to the rear wheels, thus not only preventing the machine from being run under its own power by unauthorized persons, but preventing towing thereof. Provision is made however to allow the machine to be pushed rearwardly in order that firemen, police and other authorized persons may shift the car in case of necessity.

A further object is to prevent the gear above mentioned from being shifted into mesh with other gears when the car is locked.

With the foregoing in view, the invention resides in the novel construction and association of parts hereinafter fully described and claimed, reference being made to the accompanying drawing.

Figure 1 is a sectional view of an automobile transmission and associated parts, showing the application of the invention thereto.

Fig 2 is a vertical section on the plane indicated by the line 2—2 of Fig. 1, showing more particularly the construction and mounting of the gear locking dog.

Fig. 3 is a detail sectional view on the line 3—3 of Fig. 1 illustrating the manner in which the operating handle of the dog carrying shaft may be held in either of its positions.

In the drawing above briefly described, the numeral 1 designates part of an automobile motor, 2 has reference to the fly-wheel housing, 3 designates the clutch casing, and 4 refers to the transmission casing. The usual short shaft 5 which is driven by the clutch, extends into the front end of the transmission casing 4 and carries a gear 6 meshing constantly with the driving gear 7 of the countershaft 8, and on this countershaft are the usual gears 9, 10 and 11 which come into operation respectively when the car is shifted into first (low), second (intermediate) and reverse. The usual stub shaft 12 extends through the casing 4 and has a rotatable connection at its front end with the shaft 5, while the rear end of said shaft 12 is connected by a well known universal joint 13 with the propeller shaft 14 which leads to the differential for driving the rear wheels of the machine. A relatively large gear 15 is splined on the stub shaft 12 and is shiftable into mesh with the gear 9 when the car is thrown into low, and similarly meshes with the usual idle gear 16 when reversing, said idle gear being driven by the gear 11 in the usual manner. A smaller gear 17 is slidably splined on the shaft 12 for mesh with the gear 10 when the car is thrown into second and when shifted to high, said gear 17 interlocks with the toothed extension 18 on the gear 6, in the usual manner. The well known forks 19 depend from the rods 20 and may be shifted in the well known manner by the ordinary shifting lever 21.

The features so far described are all of well known construction and are illustrated and explained only for the sake of showing the application of the present invention, which operates preferably in connection with the low speed gear 15 although in some instances it might well coöperate with the intermediate gear 17.

A vertically moving dog 22 is provided with a downturned end 23 for engagement with the teeth of the gear 15 and 17, as the case may be, and said dog is provided with depending flanges 24 which prevent sliding of the gear 15 into mesh with either of the gears 9 and 16 when said dog is lowered as shown in the drawing. Since the gear 15 rotates with the shaft 12 and the latter is positively connected with propeller shaft 14, locking of the gear in question will prevent forward towing of the car, but the latter may be pushed rearwardly, during which operation the dog 22 will ride idly over the gear teeth. Since the flanges 24 prevent shifting of the gear 15, the machine cannot be thrown into first or reverse to start the car under its own power and even should it be shifted into second by meshing the gears 17 and 10, or into high by shifting the gear 17 forwardly into engagement with the extension 18, the car cannot be operated since shaft 12 cannot turn. It will therefore be seen that the dog 22 not only prevents operation of the car under its own power by unauthorized persons, but prevents theft by towing.

At its butt end, the dog 22 is provided with a hub 25 mounted pivotally upon a longitudinal rock shaft 26 which extends preferably throughout the length of the casing 4. By means of a pin 28 on the shaft operating in an arcuate slot 29 in the hub, the dog 22 is allowed to ride over the gear teeth when the car is moved rearwardly. The lug 28 also forms an operating connection between the shaft 26 and dog 22 for raising the latter out of engagement with the gear 15 when the shaft is properly turned, and prevents sliding of the dog on the shaft.

In the present disclosure, the rear end of shaft 26 is provided with an upstanding crank arm 31 rising through a slot 32 in the floor of the machine and having a forwardly extending handle 33 on its upper end which may well extend through a slot 34 in the apron plate 34ª of the front seat. A suitable key operated bolt 35 is shown coöperating with notches 36 in the plate 34ª for locking the shaft 26 against turning when in such position as to actively dispose the dog 22 or when in position to hold said dog released.

By constructing and arranging the invention in or substantially in the manner shown and described, the machine is effectively locked, and since excellent results can be obtained from the general construction and organization shown, it may well be followed, but I wish it understood that within the scope of the invention as claimed, numerous minor changes may well be made.

I claim:

1. In an automobile lock, the combination with the transmission casing, the propeller shaft extending from said casing, and the transmission gearing in said casing including a gear rotatable with said propeller shaft; of a dog in said casing for locking said gear, a rock shaft extending into said transmission casing, said rock shaft carrying and forming a pivotal mounting for said dog, and means for operating and locking said rock shaft.

2. In an automobile lock, the combination with the transmission casing, the propeller shaft extending from said casing, and the transmission gearing in said casing including a gear rotatable with said propeller shaft; of a dog in said casing for locking said gear, a rock shaft extending into said transmission casing, means connecting said dog and rock shaft for moving the former by the latter and allowing idle movement of the dog irrespective of the rock shaft, and means for operating and locking said rock shaft.

3. In an automobile lock, the combination with the transmission casing, the propeller shaft extending from said casing, and the transmission gearing in said casing including a gear rotatable with said propeller shaft; of a dog in said casing for locking said gear, said dog having a hub provided with a slot, a rock shaft extending through said hub and having a projection extending loosely into said slot for operating the dog from the rock shaft and permitting idle movement of said dog independently of said rock shaft, and means for operating and locking said rock shaft.

4. In an automobile lock, the combination with the transmission casing located below the front floor of the car, the propeller shaft extending rearwardly from said casing, and the transmission gearing in said casing including a gear rotatable with said propeller shaft; of means in said casing for locking said gear, a rock shaft extending rearwardly from said casing for controlling said locking means, a crank arm rising from said rock shaft through the floor of the car in rear of the apron plate of the front seat, a handle extending forwardly from said crank arm, said apron plate having an arcuate slot in which the handle is movable and means for locking said handle against movement.

In testimony whereof I have hereunto set my hand.

FREDERICK L. WELLS.